Nov. 30, 1965  E. S. GANDRUD  3,220,368
METHOD AND APPARATUS FOR PLANTING AND TREATING A SEED BED
Filed Sept. 13, 1962  3 Sheets-Sheet 3
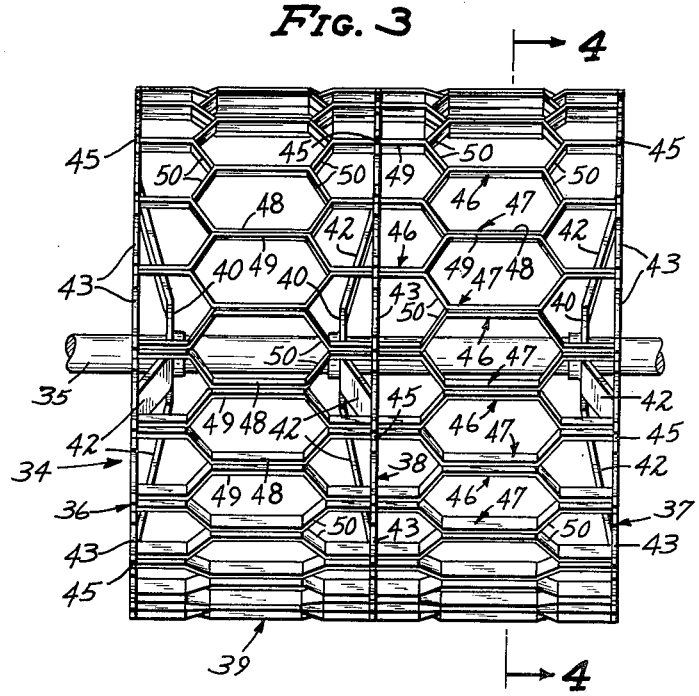
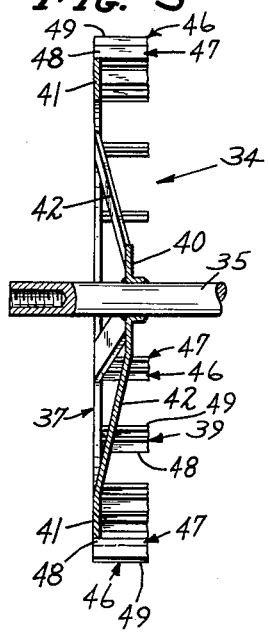
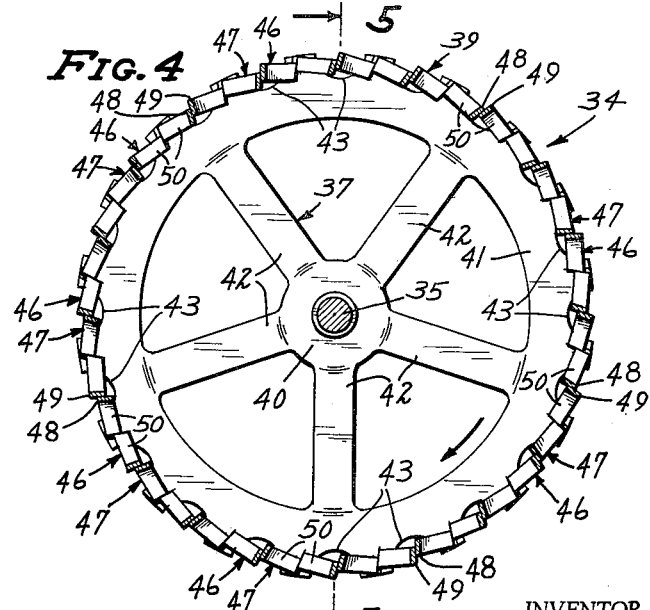
INVENTOR.
EBENHARD S. GANDRUD
BY
ATTORNEYS

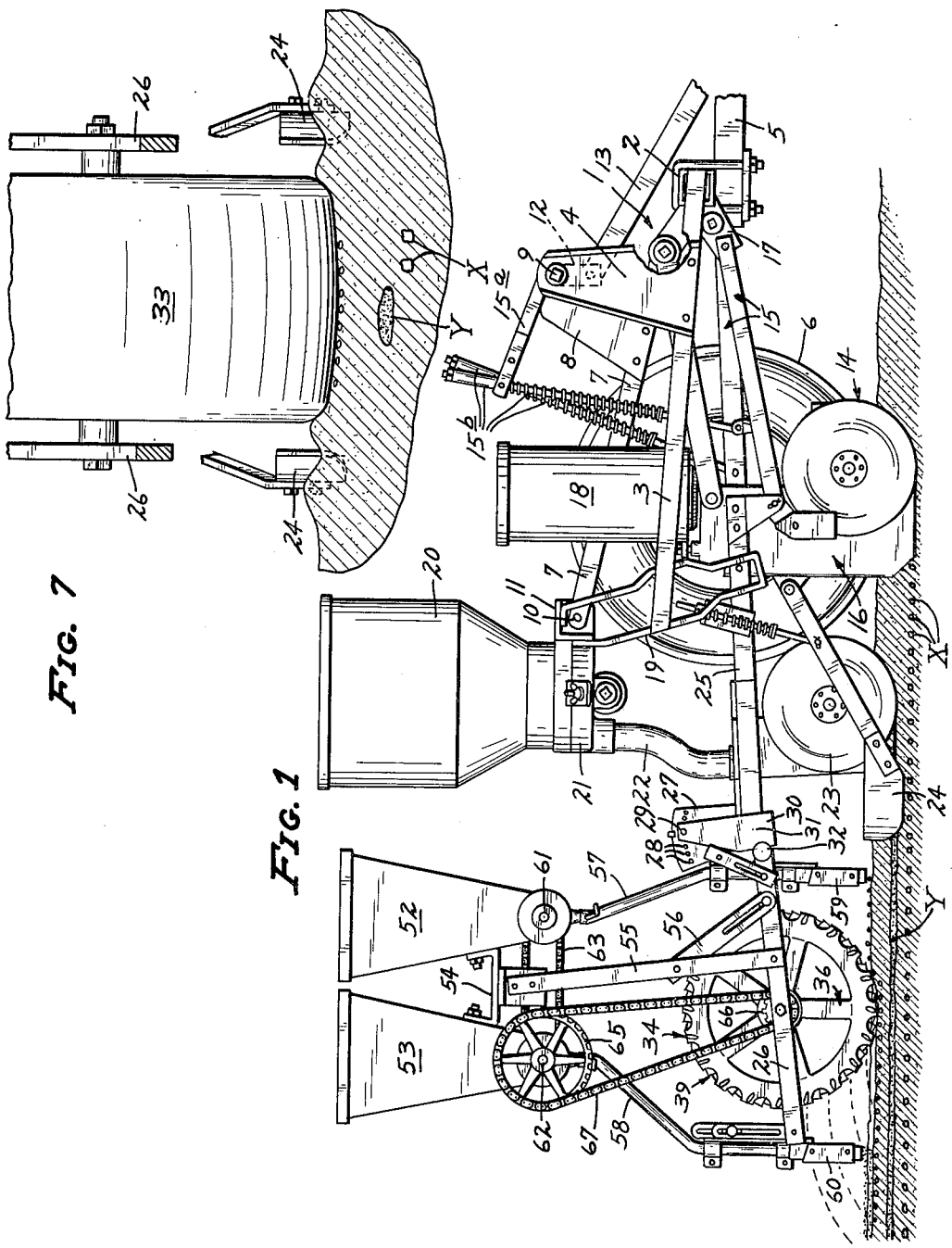

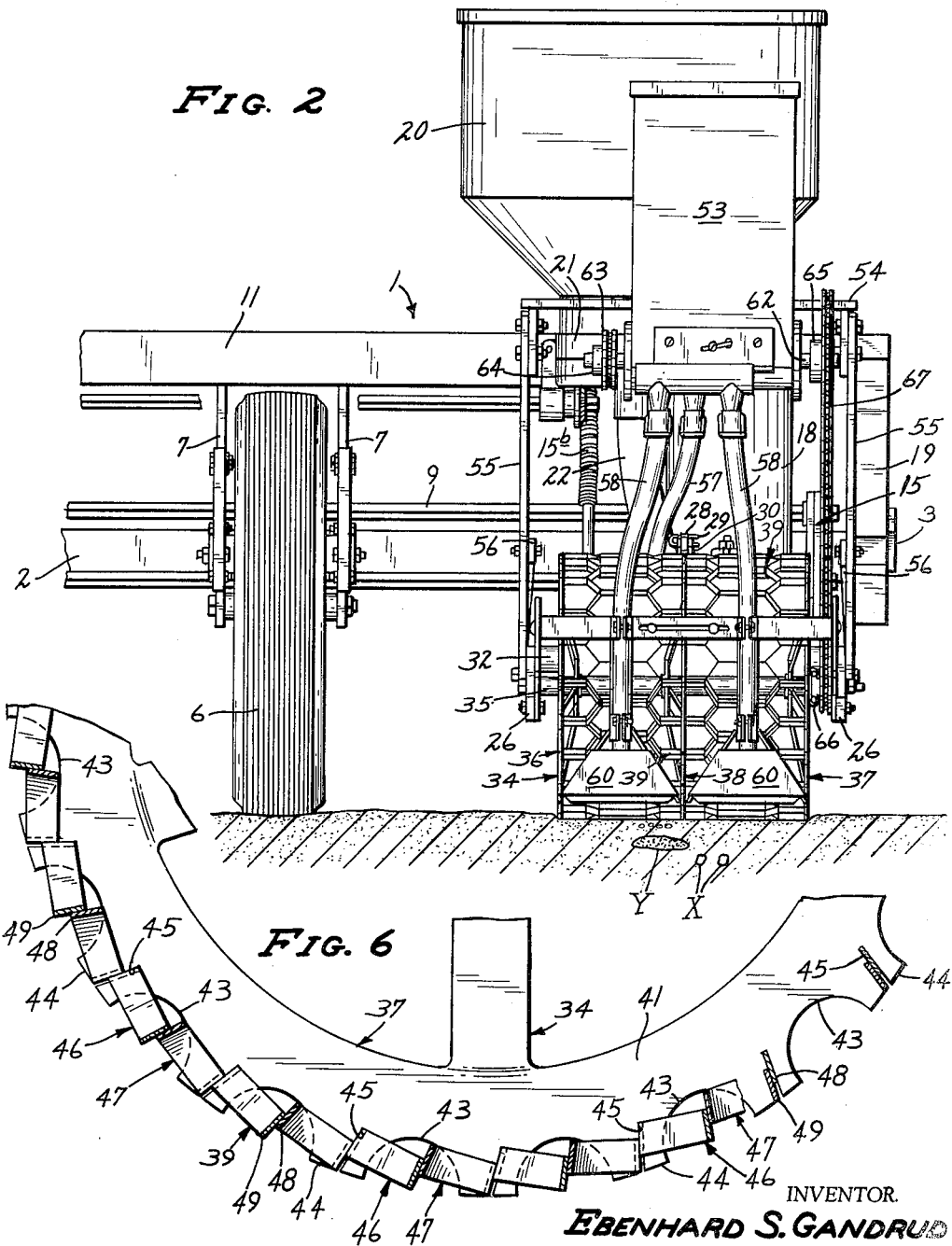

United States Patent Office 3,220,368
Patented Nov. 30, 1965

3,220,368
METHOD AND APPARATUS FOR PLANTING
AND TREATING A SEED BED
Ebenhard S. Gandrud, % Gandy Co., 100 Gandrud Road,
Owatonna, Minn.
Filed Sept. 13, 1962, Ser. No. 223,449
8 Claims. (Cl. 111—9)

My invention relates generally to agricultural implements, and more particularly to improvements in implements for planting or sowing seed.

More specifically, my invention relates to improvements in rollers or press wheels used with planting or sowing devices associated with seed planting or sowing implements to pack the ground over the seed and otherwise treat the ground surface after the seed has been sown, or planted.

Heretofore, particularly in the planting of row crops, such rollers or press wheels have been provided with smooth metal or rubber ground-engaging rims or tires which leave smooth tracks on the ground surface and which compact and pack the surface soil only over the subsoil in which seeds have been planted. These smooth rims or tires leave hard packed smooth surfaced rows flanked by shallow channels or ruts in which water runs off without soaking downwardly to the planted seed. Thus, particularly at higher levels, sufficient moisture is prevented from reaching the seed. Moreover, wheels of this type provide a surface which is not conducive to the retention and incorporation of granular or powdered chemicals for destruction of noxious weeds for the full and uniform 14" width recommended for a planted crop row and for the elimination of injurious insects, when subsequently distributed over the ground, particularly when a field is subject to the action of wind or water.

An important object of my invention is the provision of a roller or press wheel which not only packs only the subsoil around and over the seed more uniformly than heretofore, so that some looseness is retained in the soil above the seed, but which effectively breaks up the top soil, soil clumps or clods leaving a layer of loose mulched soil over the planted row terrain.

It is well known, among those skilled in the art, that a layer of loose soil overlying more firmly packed earth acts as a blanket or layer to retard evaporation of moisture from the underlying packed earth. Accordingly, another object of my invention is the provision of a roller which works the subsoil during the packing thereof, and to produce a top surface portion which is loosely spread over the underlying more firmly packed seed covering portion, and which is substantially level with adjacent surface areas of the field.

In the application of granular, powered or liquid chemicals, such as insecticides, herbicides and the like, to the ground, it has been found advisable to thoroughly mix or incorporate the chemical with the portion of the ground above the planted seed to prevent undue evaporation or deterioration of the chemical into the atmosphere above ground level. Hence, another object of my invention is the provision of a roller which, during rotation thereof over the ground, accomplishes such incorporation when the chemical is applied to the ground surface.

Another object of my invention is the provision of a roller which is adapted for use as a cultivator to uproot weeds between crop rows during growth of the row crops, particularly at an early stage of growth of the weeds, thus promoting plant growth.

To the above ends, I provide a roller type row wheel including a pair of axially spaced flanges and a generally cylindrical rolling rim-type body comprising a plurality of primarily axially extending generally radial blades, each blade having circumferentially and axially spaced leading and trailing portions relative to the direction of rotation of the wheel and angularly displaced portions connecting said leading and trailing portions. By this arrangement and connection of the blades adjacent ones of said blades cooperate to define polygonal openings with each of the leading and trailing portions of each blade being angularly displaced from a radius extending therethrough and in a direction in which the radially outer edges of said leading and trailing portions precede the radially inner edges thereof in the direction of rotation of the wheel.

(1) The blades inwardly from their ground engaging edges thus contact the soil or ground in a more or less straight up and down position and impart rotation to the row wheel when said wheel is towed relative to the ground. It will be noted therefore that the ground engaging edge of each blade of the cylindrical series of blades actually stands still relative to the ground as it comes in contact therwith on towing movement of said wheel over the ground. Further that on such forward movement of the row wheel the angle of the body of each blade above its said ground engaging edge constantly changes its angle thereafter relative to the ground as would the body of a spade and thus digs itself into the ground on continued rotary forward movement of the row wheel.

(2) As the said blades successively dig themselves into the ground on continued forward and rolling movement of said row wheel and are thus constantly rocked forward in their travel backwardly and upwardly with said wheel, the body of each blade emerging from the ground at the rear of said wheel will actually be substantially parallel with the ground surface. During such rolling movement of the row wheel, therefore, the interconnecting angle bar portions connecting adjacent generally radial blade members will be pulled downwardly therewith into the earth in following the curvature of the wheel which compacts and firms the subsoil in much the same manner as does a "sheep foot" roller in industrial construction work.

(3) As each said angularly supported blade is thus arcuately moved downwardly through the surface of the ground and subsoil and then finally upwardly and rearwardly by the continued rolling movement of said wheel successive blades which are rocked forwardly at such time as they emerge from the ground will lift thereon as much of the top soil as will adhere thereon cascading same to the rear of said wheel. Such lifted and rearwardly cascaded soil thereupon falls on the row terrain to provide a loose top layer of soil-mulch for the entire width of the roller or row wheel.

(4) Therefore it is a primary object of my invention to utilize this aerated projectory of soil particles rearwardly from the rotary traveling blades of my row wheel or drum to incorporate therewith at such time desired amounts of chemicals in spray and/or granule form. A loose layer of prepared mulch is thus provided over the row terrain. By this means added chemicals are more positively and accurately incorporated with the entire loose layer of top soil as a mulch which protects them from disintegrating effects of sun rays, scattering efforts of the winds and washing and flushing away action from rains. The complete elimination of troughs in the wake of row wheels also serves to prevent soil erosion.

The above, and still further highly important objects and advantages of my invention will become apparent from the following detailed specification, appended claims and attached drawings.

Referring to the drawings, which illustrate the invention, and in which like reference characters indicate like parts throughout the several views:

FIG. 1 is a fragmentary view, in side elevation, of a seed planting implement having a roller or wheel of my invention mounted thereon;

FIG. 2 is an enlarged fragmentary view in rear elevation as seen from the left with respect to FIG. 1;

FIG. 3 is a still further enlarged view in front elevation of the roller of my invention;

FIG. 4 is a transverse section taken on the line 4—4 of FIG. 3;

FIG. 5 is a fragmentary section taken substantially on the line 5—5 of FIG. 4;

FIG. 6, sheet 2, is a greatly enlarged fragmentary view corresponding to a portion of FIG. 4; and FIG. 7 is a fragmentary view corresponding to a portion of FIG. 2, but showing a conventional row or press wheel, some parts being broken away and some parts being shown in section.

Referring with greater detail to the drawings, a conventional seed planter is shown fragmentarily, the same involving a frame structure 1 including a tubular, cross-sectionally rectangular transverse frame member 2 and end frame members 3, one of which is shown, the end frame members 3 being welded or otherwise rigidly secured at their front ends to the opposite ends of the frame member 2, and being provided with upstanding bracket elements or the like 4, one of which is shown. A hitch bar or the like 5 is rigidly secured to the frame member 2 and is adapted to be coupled to the drop bar of a tractor or other pulling means not shown, in the usual manner, and the frame structure is supported in spaced relation to the ground by a pair of pneumatic tire equipped wheels or the like 6, one of which is shown, the wheel 6 being secured to the transvere frame member 2 by structure including a pair of arms 7 having brackets 8 thereon which journal intermediate portions of a transverse shaft 9, the opposite ends of which are journalled in the bracket elements 4. The front ends of the arms 7 are suitably connected to the frame member 2, the rear ends thereof being anchored, as indicated at 10, to a transverse frame bar 11. Means for rotating the shaft 9, for a purpose which will hereinafter become apparent, includes a crank element 12 secured to the shaft 9, and a pitman arm 13 which is adapted to be connected to a suitable source of power, not shown, for moving the same.

The planter shown includes a furrowing device 14 that is carried by a trailing arm 15 the front end of which is pivotally secured to a bracket 17 anchored to the transverse frame member 2. Also carried by the trailing arm 15 is a seed hopper 18 and conventional feeding mechanism 16 for delivery of seed to the furrow, indicated at X in FIGS. 1 and 2. The transverse frame member 11 is supported at its opposite ends by end brackets 19 and carries one or more hoppers 20 and conventional feeding mechanism contained within a housing 20 for delivery of granular or powdered fertilizer material through conduit means 22 to the ground between axially spaced disks 23 disposed rearwardly of the furrowing device 14, only one of the disks 23 being shown in FIG. 1. The disks 23 cooperate to cover the seed and leave a furrow slightly to one side of the seed for deposit of fertilizer, indicated at Y. Following the disks 23 are furrow covering blades or elements 24. The trailing arm structure 15 is raised or lowered by rocking or partial rotary movement of the shaft 9, through the crank arm structure 15a and spring equipped links 15b, see FIG. 1.

The trailing arm 15 comprises front and rear sections 25 and 26, to the former of which are mounted the furrowing devices 14 and 23 and seed dispensing devices. The rear end of the front section 25 is provided with an upstanding plate-like quadrant 27 having a plurality of openings 28 therein for selective reception of a locking pin 29 that is adapted to extend through a suitable opening in a plate-like member 30 pivotally mounted to the rear end portion of the front section 25, as indicated at 31. The rear trailing arm section 26 is bifurcated, opposite sides thereof being connected by a rigid transverse shaft or member 32 welded or otherwise rigidly secured to the lower end portion of the plate-like member 30. With this arrangement, the rear arm section 26 may be raised or lowered relative to the front trailing arms section 25. A roller or press wheel is journalled between opposite sides of the bifurcated rear trailing arm section for compacting the earth above the seed Y, a commercial form of smooth rubber tired press wheel being shown in FIG. 7 and indicated by the reference character 33, the roller of my invention being shown in FIGS. 1–6 inclusive and indicated generally by the reference character 34. With the exception of the roller 34, the above-described planter structure is conventional and well known in the art. Inasmuch as the same does not, in itself, comprise the instant invention, further showing and detailed description is believed to be unnecessary. Hence, in the interest of brevity, such further showing and description is omitted.

The roller 34 comprises a central shaft 35 that extends transversely of the direction of travel of the planting implement and row wheel 34 and which is journalled in the opposite sides of the trailing arm 26, a pair of end flanges 36 and 37 and an intermediate flange 38, and a generally cylindrical ground engaging rim indicated in its entirety by the reference numeral 39. Each of the flanges 36–38 comprises a central hub 40 that is welded or otherwise rigidly secured to the shaft 35, an annular outer edge portion 41, and a plurality of widely circumferentially spaced spokes 42 integrally formed with and connecting hub portions 40 with their respective annular outer edge portions 41. The outer peripheral edges of the annular portions 41 are formed to provide circumferentially spaced radially outwardly opening notches 43, which define therebetween radial teeth 44, the teeth 44 being formed to provide generally radially outwardly opening slots or the like 45, the purpose of which will hereinafter become apparent.

The generally cylindrical ground engaging rim 39 comprises a plurality of generally axially extending generally radial blades 46 and 47 alternately disposed about the periphery of the roller 34. Each blade 46 and 47 comprises circumferentially and axially spaced axially extending leading and trailing portions relative to the direction of rotation of the roller 34, the leading portions being indicated at 48 and the trailing portions being indicated at 49, the leading portions of each blade 46 and 47 being connected to the trailing portions thereof by angularly displaced connecting earth working and compacting bar portions 50. The axially extending leading and trailing portions of each blade 46 and 47 are disposed in overlapped partial face-to-face engagement with trailing and leading faces respectively of adjacent ones of the blades, and are spot welded or otherwise rigidly secured to each other in such face-to-face engagement. In other words, the leading portions of each blade are secured in face-to-face engagement with the doubling the thickness and strength of each blade portion throughout its length trailing portions of a preceding blade. In the embodiment of the invention illustrated, it will be noted that the angular relationship of the connecting portions 50 to the leading and trailing portions 48 and 49 is such that the blades 46 and 47 cooperate to define radial openings that are hexagonal in shape, the openings being elongated in a direction axially of the roller 34. The intermediate portions and opposite ends of the blades 46 and 47 are received in the slots 45 of the flanges 36–38, and are preferably welded therein to provide a rigid roller structure. With reference to FIGS. 2, 3 and 5, it will be seen that the hub portions 40 are axially offset from the planes of the annular outer edge portions 41, an arrangement which further adds to the rigidity of the roller 34.

The slots 45 have been described as being disposed generally radially in their respective teeth 44. In actual practice, the slots 45, as well as the axially extended leading and trailing portions 48 and 49 respectively of the blades 46 and 47 are each angularly displaced relative to a radius of the roller extending therethrough and in a direction relative to the direction of rotation of the roller to dispose the radially outer edges of the leading and trailing portions forwardly of the radially inner edges thereof relative to the direction of rotation of the roller 34. In the form of the invention illustrated, the arrangement is such that each blade 46 and 47 is angularly displaced to dispose the leading portions 48 radially inwardly relative to the trailing portion 49 thereof. Thus, the leading and trailing portions of each blade overlap adjacent portions of adjacent blades for at least one-half of their radial depth, to permit spot welding of the blades together to provide a rigid rim structure. It will be noted that the slots 45 are each provided with stepped bottoms to provide for proper seating of each blade in its overlapping relationship with adjacent blades.

As is usual with rollers or press wheels utilized in connection with planting implements, a portion of the weight of the trailing arm and planting devices mounted thereon is carried by the roller. I utilize this weight to cause the progressively advancing earth cutting blades at the forward side of the roller to cut first into the surface of the ground substantially normal thereto and to thereafter rock relative to the ground in spade-like manner as they successively cut into, work and compact the subsoil over the planted seeds and finally emerge through and lift the top soil at the rear side of the roller to cascade same upon the ground as shown in FIG. 1.

The above-described angular displacement of the leading and trailing axially extended portions of the blades 46 and 47 causes the top surface portion of the ground to be shoveled upwardly and rearwardly and to fall to the ground to provide a loosely deposited top layer which serves to protect the underlying more firmly packed subsoil from the direct rays of the sun, whereby to prevent undue evaporation and aid in maintaining the overall moisture content of the ground during relatively dry intervals. Further, the above described disposition of the blades 46 and 47 causes the same to be highly effective in breaking up lumps or clods of earth.

A further highly important advantage of the instant roller resides in its usefulness in permitting the application of granular chemicals to the ground above the planted seed and during the planting operation, and without the necessity for moving a second implement over the field to accomplish the desired results. With reference to FIGS. 1 and 2, it will be seen that a pair of supply hoppers 52 and 53, connected by a bracket or the like 54, are mounted from the opposite sides of the trailing arm section 26 by suitable legs 55 provided with adjustable brace members 56. Flexible conduit elements 57 and 58 are connected to the lower discharge ends of the hoppers 52 and 53 respectively, and have their lower ends connected with respective distributor heads 59 and 60 mounted between opposite sides of the trailing arm section 26. Both of the hoppers 52 and 53 are provided at their lower end portions with feeding rotors, not shown, but including rotary shafts 61 and 62 respectively, the shafts being connected for common rotation by an endless link chain 63 entrained over a pair of sprocket wheels 64 one of which is shown, the sprocket wheels 64 each being mounted on a different one of the shafts 61 and 62. A sprocket wheel 65 is mounted fast on the shaft 62 and is driven from a cooperating sprocket wheel 66 mounted on the row wheel shaft 35, by an endless link chain 67. The above described dispensing devices including the hoppers 52 and 53 are of the type disclosed and claimed in my prior United States Letters Patent 2,852,166 and entitled "Dispenser for Granular or Powdered Material"; and the distributor heads 59 and 60 are of the type disclosed and claimed in my prior U.S. Letters Patent No. 2,990,188, and entitled "Device for Spreading Granular Material."

Assuming that it is desired to apply granular chemicals to the ground for the destruction of insects that are injurious to the planted seed, a supply of such granular chemical is introduced into the hopper 52 from whence it is fed at a predetermined rate through the conduit element 57 and distributor head 59 to the surface of the ground after the furrow has been closed by the furrow closing or covering blades 24, see FIG. 1.

As the roller 34 rotates with its blades progressively cutting into the ground behind the distributor head 59, the spading action of the blades 46 and 47 emerging from the ground substantially parallel therewith lifts the crushed topsoil cascading it to the rear and causing the granular chemical insecticide to become thoroughly intermingled or incorporated into the earth above the planted seed, the greater portion of the chemical being disposed slightly below the ground surface, where it is protected from evaporation at too great a speed to be effective as an insecticide. This fact, together with the more uniform packing of the earth over and around the planted seed than heretofore accomplished, enables the chemical, as it evaporates, to permeate the surrounding soil and be retained thereby for the desired length of time necessary to protect the seed and growing plant. Further, water, such as rain water introduced to the ground surface, leaches the chemical to cause penetration thereof deeper into the soil for effective destruction of insects and eggs thereof at lower levels.

For the purpose of destroying noxious weeds, granular weed-killing chemicals are placed in the hopper 53 and fed to the ground behind the roller 34 through the conduit 58 and distributor heads 60. The aforementioned action of the roller 34 in providing a ground surface of loose earth over the more firmly compacted underlying portion called subsoil causes the granular material dropping from the distributor heads 60 to become covered with the loosely disposed top layer of earth, so that the same is not easily blown away by the winds nor washed away by rain water, as does occur when a smooth surface is left by a metal or rubber tire, such as on the wheel 33, is used to pack the ground.

The roller 34, in addition to its use above-described, is particularly adapted for use as a cultivator wheel for row crops, especially during early growth periods of the plants and of weeds. Rolling of the roller 34 between the rows of plants and over the weed growth causes the annular edge portions 41 of the flanges 36–38, and the blades 46 and 47 to uproot the weeds and to lay the same flat on the top surface of the ground, where the roots thereof are exposed to the sun, and destruction of the weeds occurs rapidly.

My improved roller has been thoroughly tested and found to be extremely satisfactory in properly compacting the earth above the planted seed, as well as incorporating granular chemicals thoroughly with the ground above the seed. It will be appreciated that, while but a single planting device and roller are shown, any desired number of such may be used on a given plant implement.

It will be further appreciated that the roller 34 may be, in addition to its form illustrated and above-described produced in the form of an axially elongated cylinder for the purpose of incorporating broadcast seed into the ground and to treat the ground in wide swaths.

While I have shown and described a single embodiment of my roller, it will be understood that the same is capable of modification, and that modification may be made without departure from the spirit and scope of the invention, as defined in the claims.

What I claim is:

1. An apparatus for treating earth to enhance the growth of planted seed comprising means for continuously and simultaneously compacting a subsoil layer of earth over the planted seed while forming a layer of loose top earth over the compacted layer, and means for depositing weed killing chemical over the layer of loose top earth and covering the weed killing chemical in said top layer with loose earth.

2. An apparatus for treating earth to enhance the growth of planted and fertilized seed, comprising means for continuously and simultaneously depositing a layer of insecticide over the earth covering the seed and fertilizer, means for intermingling the insecticide with said earth while compacting the subsoil earth therebelow to form a compacted layer of subsoil earth over said seed and also a loose layer of top earth intermixed with insecticide over said layer of compacted subsoil earth, means for depositing a layer of weed killing chemical over said intermixed layer, and means for covering said chemical with a layer of loose earth.

3. An apparatus for treating earth to enhance the growth of planted seed comprising means for continuously and simultaneously depositing a layer of fertilizer adjacent the planted seed, means for covering the fertilizer with a layer of earth and depositing a layer of insecticide thereover, means for intermingling the insecticide with said earth layer while compacting a subsoil layer of earth under said intermingled earth layer, means for depositing a layer of weed killing chemical over said intermingled earth layer and means for covering said chemical with a layer of loose earth.

4. An apparatus for continuous planting and earth treating comprising means for simultaneously forming a furrow and depositing seed therein, means for covering the seed with earth and depositing a layer of fertilizer adjacent the covered seed, means for covering the fertilizer with earth and depositing a layer of insecticide on said covering, means for progressively intermingling the insecticide with said last mentioned earth covering and compacting an underlying layer of subsoil earth, means for depositing a layer of weed killing chemical over the insecticide mixture, and means for simultaneously covering said chemical with a layer of loose earth.

5. The method of treating earth to enhance the growth of planted seed therein comprising the steps of continuously and simultaneously compacting a subsoil layer of earth over the planted seed while forming a layer of top loose earth over the compacted layer, and depositing a layer of weed killing chemical over said loose earth while covering said chemical with a layer of loose earth.

6. The method of treating earth to enhance the growth of planted and fertilized seed therein comprising the steps of continuously and simultaneously depositing a layer of insecticide over the earth covering the seed and fertilizer, intermingling the insecticide with said earth while compacting a subsoil portion thereof, and depositing a layer of weed killing chemical over the earth and insecticide mixture while covering said chemical with a layer of loose earth.

7. The method of treating earth to enhance the growth of planted seed therein comprising the steps of continuously and simultaneously depositing a layer of fertilizer adjacent the planted seed, covering the fertilizer with a layer of earth and depositing a layer of insecticide thereover, intermixing the insecticide with said earth layer while compacting a subsoil layer of earth therebeneath, and depositing a layer of weed killing chemical over the earth and insecticide mixture while covering said chemical with a layer of loose earth.

8. The method of continuous planting and earth treating comprising the steps of simultaneously forming a furrow, depositing seed therein and covering the seed with earth, depositing a layer of fertilizer adjacent the covered seed and covering the fertilizer with earth, depositing a layer of insecticide over the covered seed and fertilizer, intermingling the insecticide with the earth covering the seed and fertilizer while compacting an underlying layer of said earth covering said seed, and depositing a layer of weed killing chemical over the earth and insecticide mixture while covering said chemical with a layer of loose earth.

References Cited by the Examiner

UNITED STATES PATENTS

| | | | |
|---|---|---|---|
| 500,418 | 6/1893 | Over | 172—552 |
| 643,034 | 2/1900 | Bartels | 172—552 |
| 1,229,604 | 6/1917 | Garst | 111—80 |
| 1,231,353 | 6/1917 | Hicks | 111—1 |
| 1,301,043 | 4/1919 | Dougherty | 172—1 X |
| 1,839,000 | 12/1931 | Phan-Quang | 172—552 |
| 1,901,299 | 3/1933 | Johnson | 172—551 X |
| 2,200,631 | 5/1940 | Merlich | 172—552 |
| 2,619,260 | 11/1952 | Giles | 111—80 X |
| 2,669,067 | 2/1954 | Severance | 172—1 |
| 2,694,969 | 11/1954 | Chattin | 172—121 X |
| 2,713,836 | 7/1955 | Ajero | 111—80 |
| 2,730,054 | 1/1956 | McDonald | 111—10 |
| 2,842,078 | 7/1958 | Immesoeti | 111—73 |
| 2,881,848 | 4/1959 | Liston. | |
| 2,920,587 | 1/1960 | Shrives | 111—80 |
| 2,965,053 | 12/1960 | Gruber | 111—10 |
| 2,981,213 | 4/1961 | O'Neil | 111—73 |
| 3,042,118 | 7/1962 | Norris | 172—1 |

FOREIGN PATENTS

| | | |
|---|---|---|
| 205,273 | 9/1959 | Austria. |
| 612,779 | 11/1948 | Great Britain. |

ABRAHAM G. STONE, *Primary Examiner.*

WILLIAM A. SMITH III, *Examiner.*